US006362906B1

(12) United States Patent
O'Shea

(10) Patent No.: US 6,362,906 B1
(45) Date of Patent: Mar. 26, 2002

(54) FLEXIBLE OPTICAL RF RECEIVER

(75) Inventor: Richard L. O'Shea, Holliston, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/123,593

(22) Filed: Jul. 28, 1998

(51) Int. Cl.[7] .................................................. H04B 10/00

(52) U.S. Cl. ........................ 359/145; 359/175; 359/152; 359/153; 359/188; 359/195; 342/368; 342/175

(58) Field of Search .................................. 359/145, 173, 359/152, 153, 195, 188; 342/368, 175

(56) References Cited

U.S. PATENT DOCUMENTS

| | | | | |
|---|---|---|---|---|
| 4,885,589 A | * 12/1989 | Edward et al. | 342/175 |
| 5,023,634 A | * 6/1991 | Nishioka et al. | 342/368 |
| 5,029,306 A | * 7/1991 | Bull et al. | 342/368 |
| 5,227,808 A | 7/1993 | Davis | |
| 5,331,453 A | * 7/1994 | Lipsky | 357/191 |
| 5,430,451 A | * 7/1995 | Kawanishi et al. | 342/354 |
| 5,552,791 A | * 9/1996 | Metal | 342/174 |
| 5,739,938 A | * 4/1998 | Goutzoulis | 359/187 |
| 5,751,242 A | * 5/1998 | Goutzoulis et al. | 342/158 |
| 5,859,611 A | * 1/1999 | Lam et al. | 342/368 |
| 5,905,471 A | 5/1999 | Biebl et al. | |
| 6,043,776 A | * 3/2000 | Chiba et al. | 342/354 |

FOREIGN PATENT DOCUMENTS

| | | |
|---|---|---|
| DE | 43 10 532 A1 | 10/1994 |
| EP | 0 818 848 A2 | 1/1998 |
| WO | WO 96 21255 | 7/1996 |

OTHER PUBLICATIONS

Berns et al., "Wrap–Around Telemeter", Navy Technical Disclosure Bulletin, vol. 6, No. 1, Jan. 1981, pp. 43–47.

* cited by examiner

*Primary Examiner*—Leslie Pascal
*Assistant Examiner*—Hanh Phan
(74) *Attorney, Agent, or Firm*—Daly, Crowley & Mofford, LLP

(57) ABSTRACT

An array antenna is constructed of radiators disposed upon a flexible substrate wherein a plurality of receiving circuits connect with respective ones of the radiators for conversion of RF (radio frequency) signals, received by the radiators, are converted into IF (intermediate frequency) signals. The signals outputted by the receiving circuits may be applied to a beam former for generating a receive beam from the array. The receiving circuits have an elongated flexible form to permit bending of the array to have a desired configuration. All power for operating the receiving circuits and all signal paths to and from the receiving circuits are accomplished via optical fibers. Photocells are provided within the receiving circuits for conversion of optical power to operating electric power. Photodetectors within the receiving circuits provide for conversion of optical reference signal to electrical reference signals. An optical modulator within each of the receiving circuits provides for conversion of an outputted electric signal to an output optical signal for transmission via an output optical fiber. In each of the receiving circuits, a mixer provided for conversion between RF and IF is operative without a bias voltage.

29 Claims, 7 Drawing Sheets

FLEXIBLE OPTICAL RF RECEIVER

BACKGROUND OF THE INVENTION

This invention relates to reception of electromagnetic signals by an array of antenna elements connecting with respective receiving circuits and, more particularly, to the use of optical fibers for communicating received signals and for energizing the receiving circuits.

An array antenna, such as a two-dimensional array having numerous radiators arranged in rows and in columns, may be employed in situations wherein the shape of the surface of the antenna must conform to an underlying support, such as the fuselage or wing of an aircraft. Such construction, heretofore, has been laborious because the support structure which holds the radiators must be configured to fit the underlying support.

By way of example, in the situation where the antenna is formed of a set of radiators imprinted, possibly by photolithography, upon a substrate, the substrate must be built to fit the underlying support. The signals radiated and/or received by the radiators may be phase shifted, and may be provided with an amplitude taper so as to compensate for curvature in the underlying support. The structure of the antenna may be complicated by the need for multiple receiving circuits connected directly to respective ones of the radiators so as to avoid excessive signal attenuation as might otherwise develop in the communication of a received signal from a radiator to a distant receiving circuit. As an additional complicating factor, there is a difficulty in locating a multitude of wires providing for communication of signal, control, and power to the various receiving circuits.

As a further example in the deployment of an array antenna, such an antenna may be deployed by a satellite circling the earth. In such case, a rigid antenna, heretofore, has been fabricated of sections which articulate relative to each other, thereby to permit stowage on board the spacecraft which is to deploy the antenna. Such construction does not permit the use of a continuous antenna without points of articulation. In addition, the mechanical structure needed to provide for the articulation increase the weight and the complexity of the antenna. It is noted also, that in the case of the antenna carried by the spacecraft, it may be desired to construct the antenna as a series of radiators radiating in both forward and reverse direction, such an antenna being comprised of, by way of example, a set of radiators disposed on an electrically insulating substrate without use of a reflective plane. With such construction, the numerous wires interconnecting the various radiators with a beam former can act as a metallic screen which reflects radiation and, thereby, would alter the radiation pattern of the antenna.

SUMMARY OF THE INVENTION

The aforementioned disadvantages are overcome and other advantages are provided by an array antenna constructed in accordance with the invention wherein the radiators, such as dipole radiators, are disposed on a flexible sheet of electrically-insulating material. This construction enables the antenna to be placed on an underlying support which has a curved surface, such as the aforementioned fuselage or airfoil, by way of example. In addition, the flexibility of the antenna enables the antenna to be rolled into a long cylinder, by way of example, for stowage on board a spacecraft for later deployment in a planar or curved configuration, this being accomplished without the aforementioned points of articulation. Thus, a single construction of antenna can be employed to overcome the above-noted disadvantages of antennas to be deployed by spacecraft and by antennas to be borne by vehicles.

In a preferred embodiment of the invention, receiving circuits are coupled to the radiators, the coupling occurring directly at the substrate to minimize length of interconnecting electric wires between the radiators and their respective receiving circuits. In accordance with an important feature of the invention, fiber optic cables are provided for interconnecting signals outputted by the receiving circuits to a beam former, which beam former may be located at a point distant from the antenna, if desired. The individual optical fibers which communicate the received signals are free of any metallic, electrically-conducting material so as to avoid the aforementioned disadvantage of reflecting radiant energy, thereby to avoid distortion of the radiation pattern of the antenna. In addition, in accordance with a further feature of the invention, electric power for operating the circuitry in each of the receiving circuits is provided by optically transmitting power from a laser power source. The optical power is carried by an optical fiber and is converted to electric power at each of the respective receiving circuits.

In each of the receiving circuits, there is a photo cell which converts optical power of the laser, received by the optical fiber, to electrical power for operation of an IF (intermediate frequency) circuit to convert an input RF (radio frequency) signal to an IF signal, and also to provide power for operation of an optical modulator assembly upon rays of light obtained from a laser. The optical modulator assembly converts the electrical IF signal to an optical signal wherein a beam of light is modulated in amplitude by the IF signal to provide the optical output signal of the receiving circuit.

In accordance with a further feature of the invention, each receiving circuit is constructed with flexibility to allow for a flexing of the circuit concurrent upon a flexing of the antenna substrate. The flexibility of the receiving circuit is attained by constructing the receiving circuit of individual modules connected by flexible optical cable. In a preferred embodiment of the invention, each receiving circuit comprises three of the modules, the three modules being interconnected by two flexible junctions. Each of the modules itself is rigid and is constructed of discrete analog components supported on a printed circuit board. The modules include components such as the mixer, the photo cells, a photodetector for receiving an optical bias signal as well as an optical calibration signal, and the optical modulator assembly with its included laser diode. At a junction between two of the modules, supporting structure is provided at each of the modules for engagement with the interconnecting optical cable. The entire set of three modules constituting a single receiving circuit is encased with plastic film, such as shrink-wrap film which is electrically insulating. The film serves as a housing for providing dimensional stability to the assembly of the three modules, while allowing for flexing between the modules at the junction points.

In accordance with yet a further feature of the invention, in each of the receiving circuits, the three modules are connected serially to give a configuration similar to that of a pen. The length of the receiving circuit is less than the spacing between two successive ones of the radiators in a row of the radiators in the array of the antenna. Thereby, the successive receiving circuits can be arranged in the manner of the cars of a train, thereby to extend along a row of radiators of the antenna. Successive rows of the receiving circuits are employed for successive ones of the rows of the radiators in the antenna array.

In order to facilitate wiring by the optical fibers among the various receiving circuits within the array, each of the receiving circuits is provided with a set of multiple optical fibers which include a sufficient number of fibers to service all of the receiving circuits within a single row, with respect to their electric power and their signals. By way of example, if there are 25 receiving circuits in a single row, 25 of the optical fibers which have been set aside for input signals of the receiving circuits are employed in the first of the receiving circuits, Correspondingly, only 24 of this set of optical fibers are employed in the second of the receiving circuits, with 23 of the fibers being employed in the third of the receiving circuits, with corresponding reduction in the number of used optical fibers in the successive ones of the receiving circuits in the row of receiving circuits. This permits all of the receiving circuits to be fabricated with the same construction, only the interconnection of specific ones of the fibers differs among the respective receiving circuits in the row. This provides for simplicity in the physical arrangement of the components of the antenna and facilitates the construction while ensuring greater reliability in the use of the antenna even during a flexing of the antenna It is noted that the capacity for the receiving circuits to flex enables the antenna to flex without interference from the receiving circuits.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
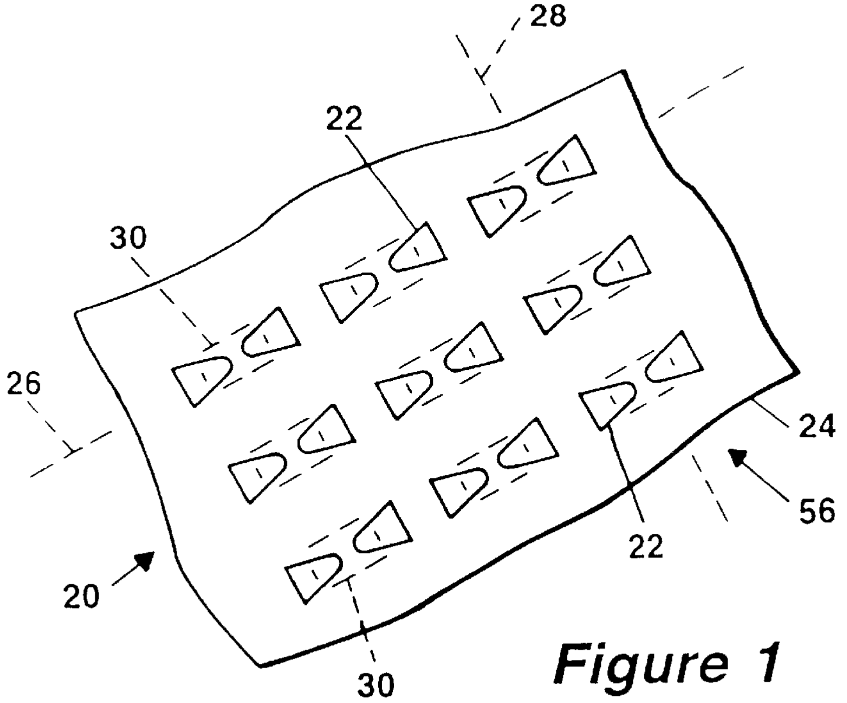
FIG. 1 is a stylized view of an antenna with radiators coupled to modular receiving circuits in accordance with the invention.
Figure 2:
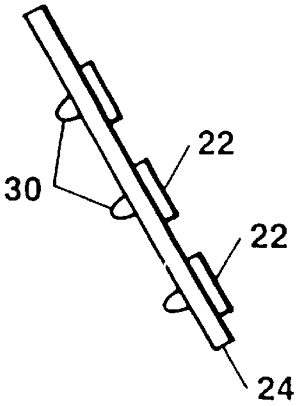
FIG. 2 is a side view of the antenna, taken along the line 2—2 in FIG. 1.
Figure 3:
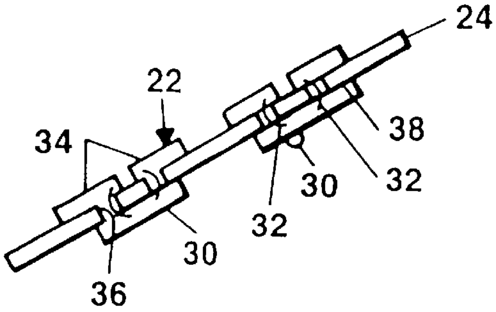
FIG. 3 is a side view of the antenna, taken along the line 3—3 in FIG. 1.

With reference to FIGS. 1–3, there is shown a portion of an antenna system 20 wherein an array of radiators 22, such as the depicted dipole radiators, are positioned on a flexible dielectric substrate 24. By way of example, the radiators 22 are constructed as patch radiators, and are positioned in an array of rows and columns, for ease of reference, the rows are parallel to an axis 26, and the columns are parallel to an axis 28. The substrate 24 has the general shape of a sheet with the radiators 22 located on a front surface of the substrate 24 while, on the back surface, there are mounted receiving circuits 30 connecting with respective ones of the radiators 22. Connection to the radiators 22, in the case of the dipole radiators, is accomplished by means of two electrical wires 32 connecting the two wings 34 of a radiator 22 with the corresponding one of the receiving circuits 30. The wires 32 pass through apertures 36 in the substrate 24. The receiving circuits 30 may be secured by any suitable means, such as by an adhesive 38 to the back surface of the substrate 24. If desired, the receiving circuits 30 may be located directly behind the corresponding radiators 22, in which case the receiving circuits 30 are also arranged in an array of rows and columns.

Figure 4:
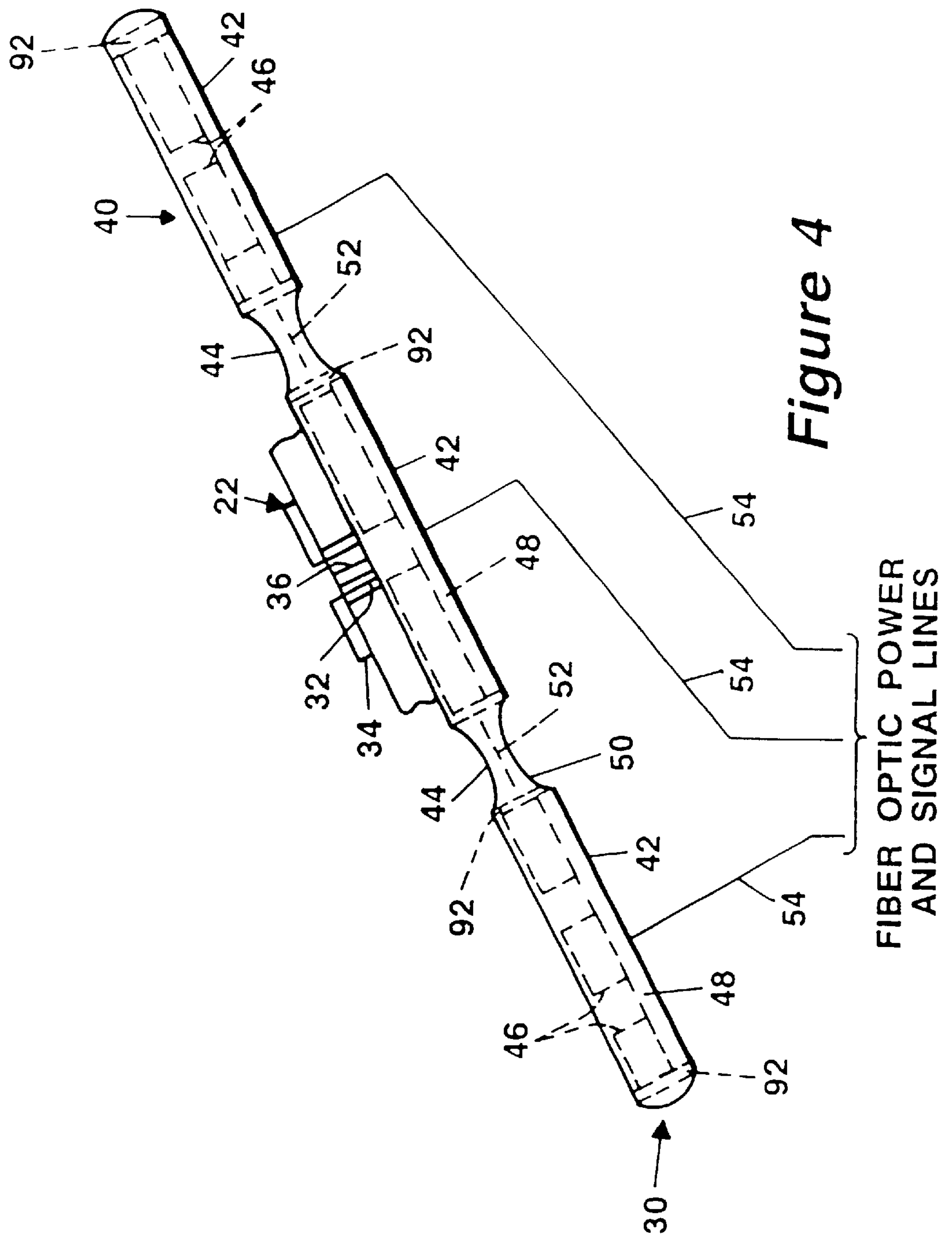
FIG. 4 shows, diagrammatically, construction of a receiving circuit in the antenna of FIG. 1.

With reference to FIG. 4, each of the receiving circuits 30 is constructed as an assembly 40 of individual modules 42 which are interconnected at junctions 44 so as to provide an overall configuration to the assembly 40 of an elongated object, such as a pen. Also shown in FIG. 4 is an interconnection of the receiving circuit 30 with a corresponding radiator 22, the interconnection being made by the wires 32, shown passing through a fragmentary portion of the substrate 24. Each of the modules 42 contains a portion of the circuitry of the receiving circuit 30. By way of example, components 46 of the receiving circuit 30 are shown in phantom, and are mounted on a suitable support, such as a printed circuit board 48, also indicated in phantom. The entire assembly 40 is covered with a sheath 50 of flexible plastic material which serves the function of sealing the components 46 from the environment, and also provides a secure mechanical interconnection among the modules 42. In a preferred embodiment of the invention, plastic material commonly known as "shrink wrap", commonly used as a packaging material, is employed advantageously because such a sheath permits flexing of the assembly 40 at the junctions 44 between the modules 42.

In accordance with a feature of the invention, interconnections among the assemblies 40 is accomplished by sets of optical fibers. As will be explained hereinafter, optical fibers providing power and signals to one of the receiving circuits 30 pass through modules 42 of other ones of the receiving circuits 30. Within each of the modules 42, construction of the circuitry is in accordance with the well-known fabrication of printed circuits employing discrete components wherein electrical signals and power are communicated via electric wires. Thus, in any one of the modules 42, there are found both fiber optic communication links and communication links formed of electric wires. Such optical fibers and electric wires also pass through the junctions 44 where are they are indicated as dashed lines at 52. The printed circuit boards 48 in each of the respective modules 42 provide rigidity to the respective modules 42, while the passage of the flexible optical fibers and flexible electric wires at 52 permits a flexing, or articulation, between the modules 42. Thereby, the assembly 44 is enabled to flex along with any flexing which may be imparted to the antenna substrate 24. Also indicated, diagrammatically, in FIG. 4, are fiber optic lines 54 providing interconnection of both power and signal to common equipment (to be described in FIG. 9). The actual routing of the fiber optic lines 54 via the modular assemblies 40 of respective ones of the rows of the modular assemblies 40 is to be described hereinafter with reference to FIG. 11.

Figure 6:
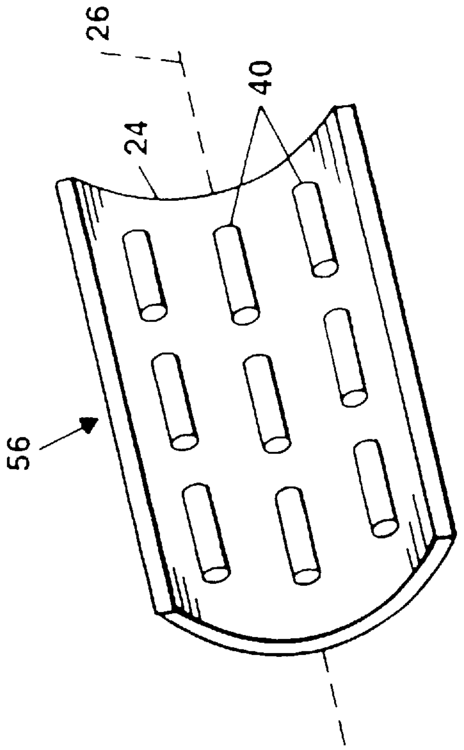
FIG. 6 shows flexibility of the antenna of FIG. 1 about a second axis.
Figure 5:
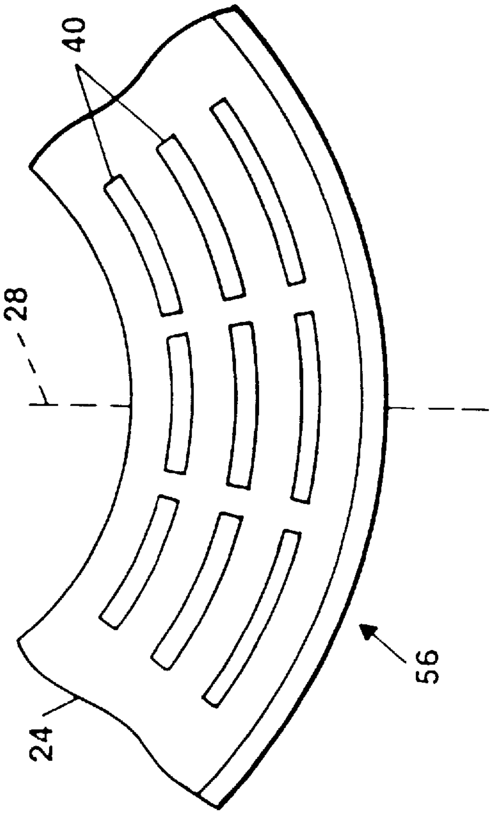
FIG. 5 shows flexibility of the antenna of FIG. 1 about a first axis.

With reference to FIGS. 5 and 6, a fragmentary portion of the antenna substrate 24 is depicted with a plurality of the modular assemblies 40 arranged in rows and columns, corresponding to the array of FIG. 1. To facilitate the description, it is convenient to consider the radiators 22, the substrate 24, and the receiving circuits 30 as constituting an antenna 56 which is a part of the antenna system 20. The antenna system 20 also includes cabling comprising the fiber optic lines 54, and common equipment 58 (shown in FIG. 9) comprising power generation, signal generation, and beam forming. As shown in FIGS. 5 and 6, the flexibility of the antenna substrate 24 and the flexibility of the modular assemblies 40 permits a bending or flexing of the antenna 56 about an axis parallel to the axis 28 (FIG. 1) as shown in FIG. 5, or about an axis parallel to the axis 26 (FIG. 1) as shown in FIG. 6. Thereby, the antenna 56 of the invention is conformable in two dimensions to match a desired surface.

Figure 7:
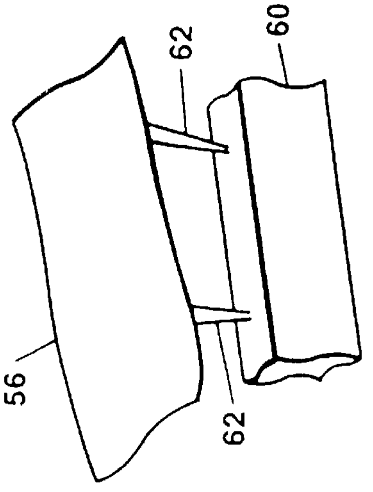
FIG. 7 is a stylized view of the antenna of FIG. 1 supported by a spacecraft.
Figure 8:
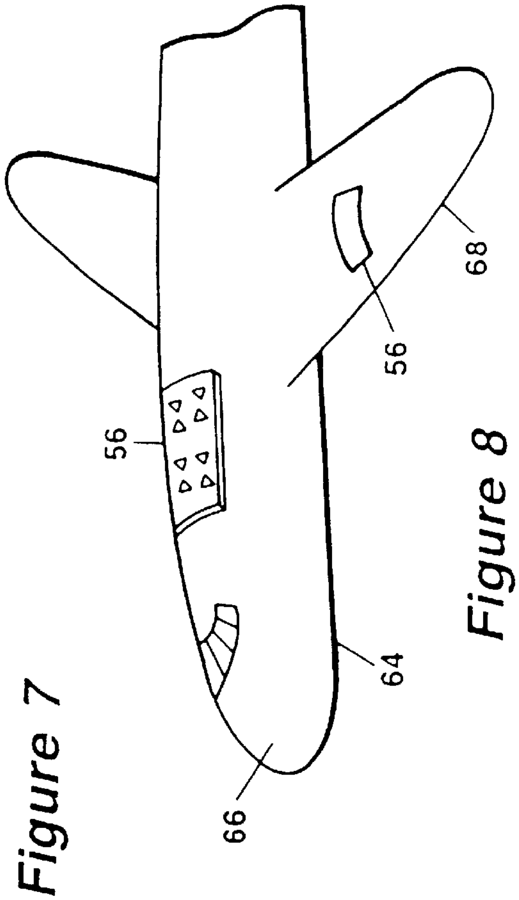
FIG. 8 is a stylized view of the antenna of FIG. 1 mounted by conformable curvature to the surface of the skin of an aircraft.

FIGS. 7 and 8 provide two examples of the conformable aspect of the invention. In FIG. 7, a spacecraft 60 has struts 62 for supporting the antenna 56 during movement of the spacecraft 60 along a trajectory, such as passage along a path circling the earth. A suitable frame (not shown) may be employed to maintain the antenna 56 in a desired configuration with bending about both of the aforementioned axes 26 and 28. Such a frame would be fabricated of material which is nonreflective to electromagnetic radiation, thereby to avoid interfering with the radiation pattern of the antenna 56. In FIG. 8, an aircraft 64 carries the antenna 56 mounted to a curved portion on the skin of the fuselage 66. Thereby, a common construction of the antenna 56 may be employed in two different situations of required flexing. In addition, without alteration of the physical configuration of the antenna 56, the antenna 56 could be mounted alternatively to an airfoil surface, such as on the wing 68 of the aircraft 64. This avoids the necessity for customizing the physical configuration of an antenna to fit different types of curved surfaces.

Figure 9:
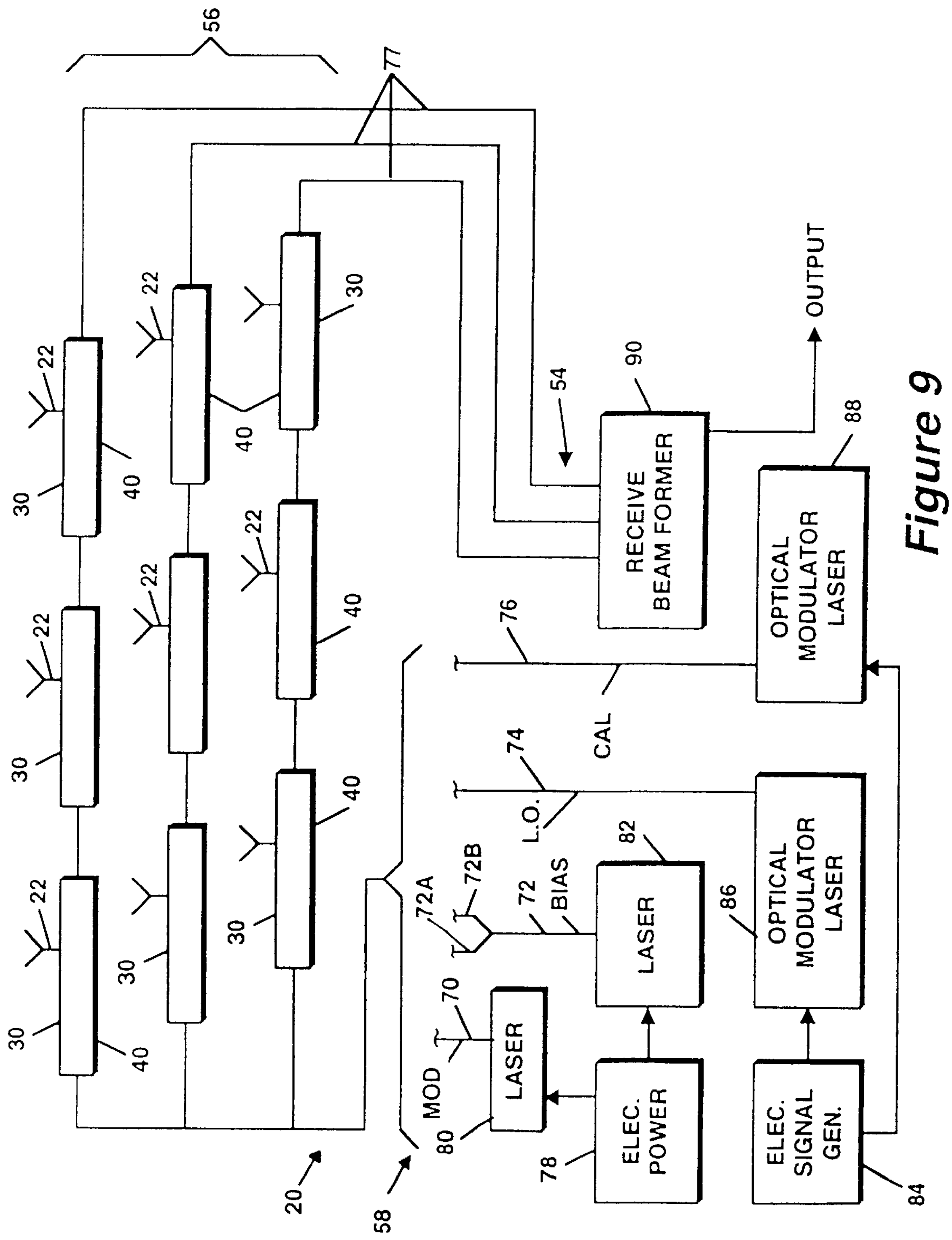
FIG. 9 shows diagrammatically interconnection of optical signals from common equipment to a multiplicity of the receiving circuits for an antenna system incorporating the antenna of FIG. 1.

FIG. 9 shows interconnection of the common equipment 58 of the antenna system 20 to the antenna 56 by means of the fiber optic lines 54 which includes fiber optic lines 70, 72, 74, 76 and 77 for providing, respectively, power for operating a modulator, bias signals, a local oscillator (LO), a calibration signal, and an output signal which are required by each of the receiving circuits 30, as will be described with further detail hereinafter. A source of electric power 78 energizes two lasers 80 and 82 which, in turn, output optical signals on the fibers 70 and 72. The line 72 is shown splitting into two fiber optic lines 72A and 72B to provide two bias functions described further with reference to FIG. 12. Alternatively, two different lasers (not shown) can be employed to energize the lines 72A and 72B.

Also included in the common equipment 58 are an electric signal generator 84 and two optical units 86 and 88 wherein each of the optical units 86 and 88 comprise an optical modulator and a laser. The signal generator 84 applies an LO signal to the optical unit 86, and provides a calibration signal to the optical unit 88. The optical units 86 and 88 are operative to provide laser beams modulated with the corresponding signals outputted by the signal generator 84. Thus, the optical unit 86 outputs an LO signal on fiber optic line 74 and the optical unit 88 outputs a calibration signal on fiber optic line 76. Output signals of the receiving circuits 30 are applied via the fiber optic lines 77 to a beam former 90 which combines the signals of the respective radiators 22 to provide a beam of received radiation which is outputted to a utilization device. Normally, the local oscillator frequencies are equal for the various receiving circuits 30. Phasing of signals from the various radiators 22 is accomplished by length of optical fibers in-the lines 74 and 77, and additional phase shift may be added in the beam former 90 for the forming of a beam.

Figure 10:
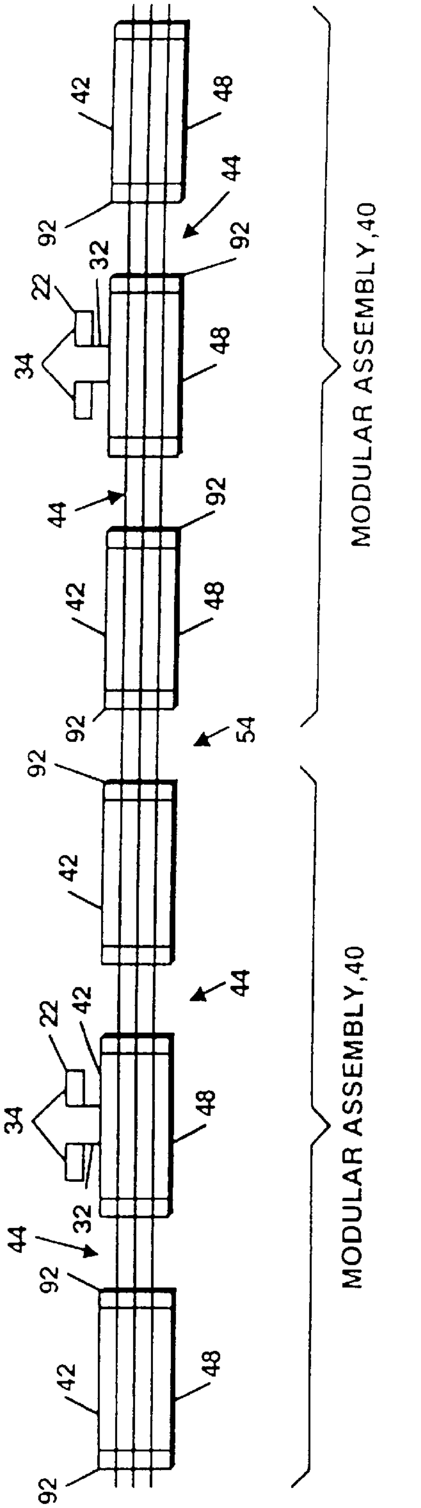
FIG. 10 shows diagrammatically a serial interconnection of optical fibers in modular assemblies of each of a plurality of the receiving circuits.

FIG. 10 shows, diagrammatically, a simplified view of two of the modular assemblies 40 connected serially in one of the rows of the antenna 56 of FIGS. 5 and 6. FIG. 10 has been simplified by deletion of the sheath 50 and the components 46, shown in FIG. 4. FIG. 10 shows also a connection of the wings 34 of the radiator 22 to the middle module 48 in each of the assemblies 40, this corresponding to the location of the radiator 22 in FIG. 4. However, it is noted that if desired, the radiator 22 may be connected directly to the first of the modules 42 at the left side of the assembly 44 or, if desired, even at the last of the modules 48 on the right side of the assembly 40. The presence of electric wires in each of the junctions 44 permits flow of signals from the radiator 22 to the circuitry connected thereto irrespective of which of the modules 42 is connected to the radiator 22.

FIG. 10 demonstrates the running of the fiber optic lines 54 serially from one of the assemblies 40 to the next of the assemblies 40 and, continuing through the rest of the assemblies (not shown in FIG. 10) located within the row and serially connected to the assemblies 40 shown in FIG. 10. At the opposite ends of each of the modules 42, contiguous the junctions 44, there are provided end plates 92 secured to the printed circuit boards 48 of their respective modules 42. The end plates 92 serve to hold the fiber optic lines 54 in position, thereby to guide the lines 54 through the modules 42 and between the modules 42 at the junctions 44.

In accordance with a feature of the invention, it is recognized that the fiber optic lines 54 have a very small diameter, as compared to cross-sectional dimensions of a module 42, and that, therefore, it takes relatively little space to run the lines 54 directly through the modules 42. This has the advantage of avoiding the use of separate bunches or cables of the fiber optic lines, thereby to simplify the construction of the antenna 56. This also provides for greater strength and resistance to breakage by running the fiber optic lines 54 directly through the modular assemblies 40.

Figure 11:
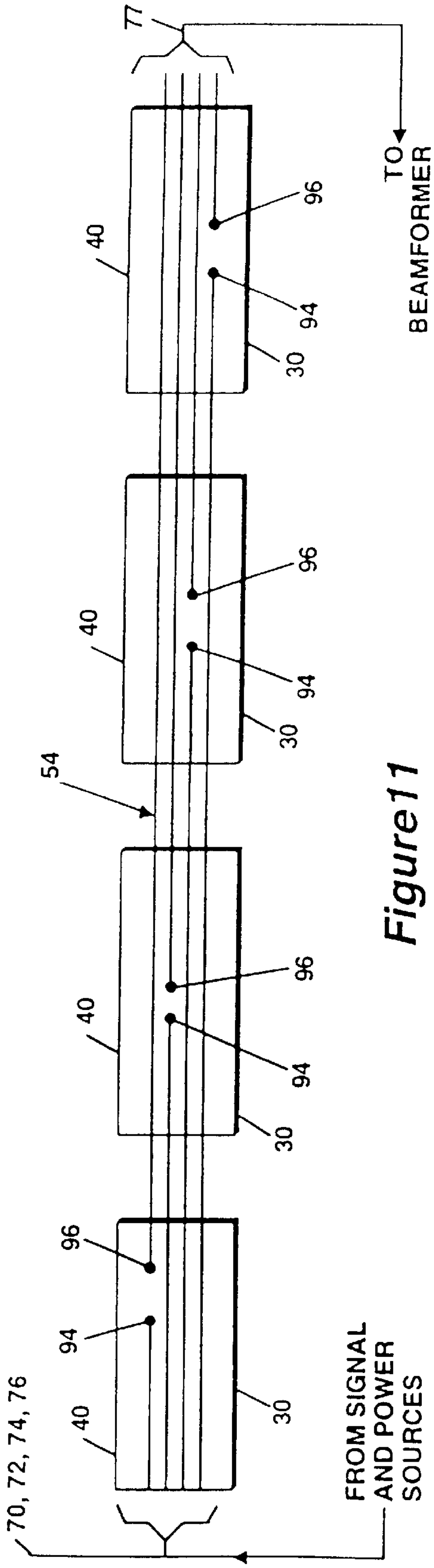
FIG. 11 shows equality of construction of each of the modular assemblies of FIG. 10, and wherein individual ones of the optical fibers are connected to designated ones of the modular assemblies.

In FIG. 11, there is shown, diagrammatically, an arrangement of the fiber optic lines 70, 72, 74, and 76 entering a row of the modular assemblies 40 at the left side of the figure, and the exiting of the fiber lines 77 from the module 40 at the right hand end of the row (or string) of the modular assemblies 40. To facilitate the drawing of FIG. 11, only four of the modular assemblies 40 are shown, and only four sets of fiber optic lines are shown. In this example, each fiber optic line set is understood to be a cable of optical fibers, wherein each cable comprises a fiber from each of the lines 70, 72A, 72B, 74, 76, and 77.

A feature of the invention is the constructing of each of the modular assemblies 40 in the same fashion. Thus, each of the modular assemblies 40 comprises the same number of fiber optic lines. There is a sufficient number of the fiber optic lines within each of the modular assemblies 40 to accommodate all of the assemblies to be connected within a single string of the assemblies 40. In the first of the modular assemblies, to the left side of FIG. 11, the first optical cable has been broken to make connection of its fibers with various components within the first assembly 40, this being indicated by terminals 94 and 96. Thus, the fibers intended for connection of the modulator power signal of line 70 (FIG. 9), the bias signals of line 72 (FIG. 9), the line 74 of the LO signal (FIG. 9), and the lines 76 and 77 of the calibration and the output signals (FIG. 9) terminate at terminal 94 at which point they connect with various components of the receiving circuit 30 of the first modular assembly 40.

The signal outputted by the receiving circuits 30 of the first assembly 40 connects at terminal 96 to the specific optic fiber of the fiber optic line 77 which has been designated for servicing the first of the modular assemblies 40. From terminal 96, the remainder of the line 77 continues without interruption through the second, third and the fourth of the assemblies 40. In similar fashion, the second of the optical cables passes without interruption through the first of the assemblies 40 and terminates in the second of the assemblies 40 at the terminal 94 for connection with components of the corresponding receiving circuit 30. A signal outputted by the receiving circuit 30 is connected via terminal 96 to the output fiber optic line 77, and continues along this optic line without interruption through the third and the fourth of the modular assemblies 40.

In similar fashion, the third of the optic cables passes through the first and the second of the assemblies to make connection with the components in the third of the assemblies 40, this being accomplished via terminals 94 and 96. The signal outputted by the corresponding receiving circuit 30 is carried, without interruption, via one of the fiber optic lines 77 through the fourth of the assemblies 40. Also, the fourth of the optic cables passes without interruption through the first three of the assemblies 40, and makes connection with the components of the receiving circuit 30 in the fourth of the assemblies 40.

The arrangement of the wiring of the fiber optic lines of FIG. 11 corresponds to that shown in FIG. 9 wherein each of the fiber optic lines 70, 72, and 74, 76 and 77 branches out to provide for the bundle of optical fibers for each of respective ones of the rows of the modular assemblies 40 of the respective receiving circuits 30. The fanning out of the optical fibers from a single one of the fiber optic lines, such as the line 70, may be accomplished by suitable fiber optic power dividers or distribution networks, or, alternatively, multiple lasers can be substituted for each of the lasers 70 and 82, and multiple optical units can be substituted for the optical units 86 and 88 so as to provide for individual optical fibers connecting directly from the common equipment 58 to the respective rows of the modular assemblies 40.

Figure 12:
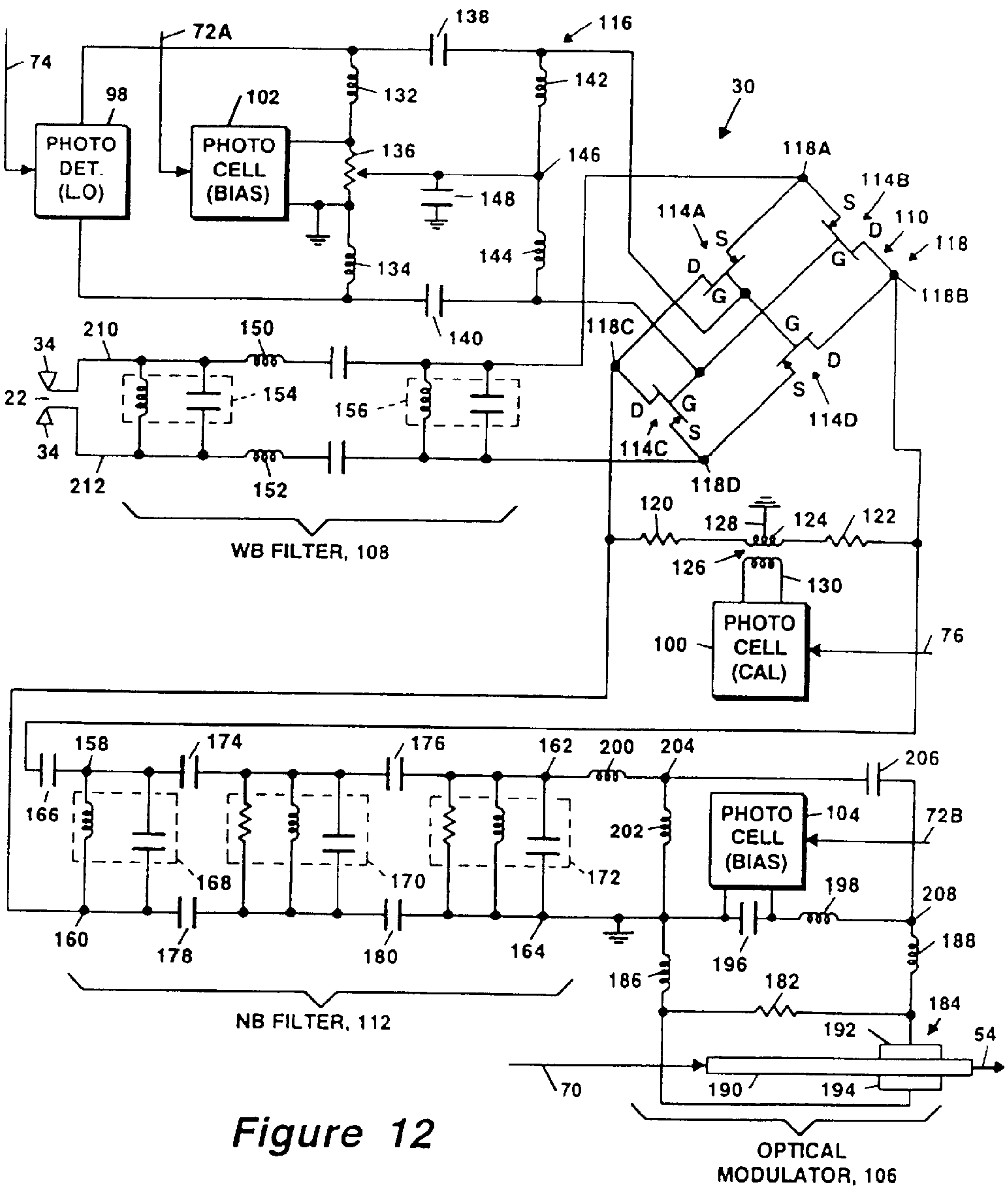
FIG. 12 is a schematic diagram of one of the receiving circuits of FIG. 1.

FIG. 12 shows electrical circuitry of the receiving circuit 30 of FIGS. 1 and 4, FIG. 12 showing also connections with the fiber optic lines 70, 72A–B, 74, 76, and 54 of FIG. 9. In FIG. 12, the fiber optic lines 74 and 76 connect respectively with photodetectors 98 and 100, the fiber optic lines 72A and 72B connect respectively with photocells 102 and 104, and the fiber optic line 70 passes through an optical modulator 106 to be outputted as the fiber optic line 54. In a preferred embodiment of the invention, the optical modulator 106 is a MarcZender modulator, by way of example. The receiving circuits 30 further comprises a wide band RF filter 108, a broad band RF ring mixer 110, and a narrow band IF filter 112.

The ring mixer 110 employs four transistors 114, preferably GaAs MESFETs, each of which has a gate (G) terminal, a drain (D) terminal, and a source (S) terminal. For ease of reference, individual ones of the transistors are further identified as 114A–D. The gate terminals of transistors 114A and 114D are connected to each other, and the gate terminals of the transistors 114B and 114C are connected together. A gate drive circuit 116 provides electrical signals for driving the gate terminals of the transistors 114. The mixer 110 has four nodes 118 of which individual ones of the nodes are further identified as 118A–D. The source terminals of the transistors 114A and 114B connect with the node 118A, and the source terminals of the transistors 114C and 114D connect with the node 118D. The drain terminals of the transistors 114B and 114D connect with the node 118B, and the drain terminals of the transistors 114A and 114C connect with the node 118C. The nodes 118A and 118D connect with output terminals of the wide band filter 108, and the nodes 118B and 118C connect with input terminals of the narrow band filter 112.

The gate drive circuit 116 and the wide band filter 108 provide input signals to the ring mixer 110, and the narrow band filter 112 extracts an output signal from the ring mixer 110. Also included in the output circuit of the mixer 110 is a series circuit of two resistors 120 and 122 connected by a winding 124 of a transformer 126, the series circuit connecting between the output nodes 118C and 118B of the mixer 110. The winding 124 is center tapped to ground at 128. The transformer 126 includes a further winding 130 connecting to output terminals of the photodetector 100.

The gate drive circuit 116 comprises the photodetector 98, the photocell 102, and a series circuit comprising two inductors 132 and 134 interconnected by a potentiometer 136. The series circuit connects between output terminals of the photodetector 98, and the potentiometer 136 connects between output terminals of the photocell 102. One output terminal of the photocell 102 is grounded at its junction with the potentiometer 136 and the inductor 134. The output terminals of the photodetector 98 connect via capacitors 138 and 140, respectively, to the gate terminals of the transistors 114A and 114D. A series circuit of two inductors 142 and 144 also connects between the gate terminals of the transistor 114A and the transistor 114C. A junction 146 between the two inductors 142 and 144 connects with a sliding tap of the potentiometer 136. A capacitor 148 grounds the junction 146.

In the wide band filter 108, one input terminal thereof connects to one of the wings 34 of a radiator 22 of FIG. 1, and also connects via a series LC (inductor-capacitor) circuit 150 to the mixer node 118A. A second input terminal of the filter 108 connects with the second wing 34 of the radiator 22, and also connects via a second series LC circuit 152 to the mixer node 118D. Also included within the filter 108 is a first LC tank circuit 154 connecting between the input terminals of the filter 108, and a second LC tank circuit 156 connected between the mixer nodes 118A and 118D.

The narrow band filter 112 has input terminals 158 and 160, and output terminals 162 and 164. The mixer node 118B connects via a capacitor 166 to the input node 158 of the filter 112. The mixer node 118C connects directly with the input terminal 160 of the filter 112. The filter 112 comprises three LC tank circuits 168,170, and 172 wherein each of the tank circuits 170 and 172 also includes a resistor. The capacitor 166 is relatively large, so as not to influence the frequency response of the filter 112, and serves to couple the resistance of the serially connected resistors 120 and 122 to appear in parallel with the LC tank 168. Also included within the filter 112 are two serially connected capacitors 174 and 176 which interconnect the input terminal 166 with the output terminal 162, and also serve to interconnect the tank circuits 168, 170, and 172. Similarly, two capacitors 178 and 180 are serially connected between input terminal 160 and output terminal 164, the capacitors 178 and 180 serving also to interconnect the tank circuits 168, 170, and 172. The capacitors 174 and 178 interconnect the tank circuits 168 and 170, and the capacitors 176 and 180 serve to interconnect the tank circuits 170 and 172.

The optical modular 106 comprises a resistor 182 and a capacitor 184 which are connected in parallel, and further comprises two inductors 186 and 188 connected to opposite terminals of the resistor 182. The construction of the Marc-Zender optical modulator 106 is well known and, includes a lithium niobate crystal 190 having optical transmission properties dependent on an electric field applied across the crystal 190 by plates 192 and 194 of the capacitor 184. The fiber optic line 70 connects with an input end of the crystal 190, and the fiber optic line 54 connects with an output end of the crystal 190. The photocell 104 has a capacitor 196 connected across its output terminals, and one of the output terminals connects with the output terminal of the filter 112. The inductor 186 also connects with the output terminal 164 of the filter 112, the output terminal 164 being grounded.

The second output terminal of the photocell 104 connects via an inductor 198 to the inductor 188. Thereby, the first output terminal of the photocell 104 connects via the inductor 186 to the plate 194 of the capacitor 184 and the second output terminal of the photocell 104 connects via the series circuit of the inductors 198 and 188 to the plate 192 of the capacitor 184. Two inductors 200 and 202 are serially connected between the output terminals 162 and 164 of the filter 112. A junction 204 between the inductors 200 and 202 is connected via a capacitor 206 to a junction 208 between the inductors 198 and 188.

In the operation of the circuitry of FIG. 12, the construction of the drive circuit 116 provides for a balanced application of AC (alternating current) signals outputted by the photodetector 98 to the mixer 110. The AC signals are coupled via the capacitors 138 and 140, these capacitors serving to block any DC (direct current) voltage from both the photodetector 98 and the photocell 102 from being applied between the gate terminals of the transistors 114A and 114C. The inductors 142 and 144 provide a DC short between the gate terminals of the transistors 114A and 114C. The center tap of the two inductors 142 and 144 at the junction 146 receives an output DC voltage of the photocell 102 via the potentiometer 136. The setting of the potentiometer 136 establishes the value of the DC voltage outputted to the junction 146.

The four drain terminals of the four transistors 114 are grounded via the mixer nodes 118C and 118B to the ground 128, this grounding being accomplished via the resistors 120 and 122, the inductor 124 and the ground 128. Due to the symmetrical construction of the series circuit of the resistors 120 and 122 with their connecting inductor 124, the bridge of the mixer 110 is balanced with respect to DC ground. The application of the DC voltage to the gate terminals of the transistors 114 is also balanced due to the aforementioned construction of the drive circuit 116. Thereby, DC voltage is applied between the gate terminals and the drain terminals of the bridge transistors 114 constituting the bridge of the mixer 110.

The wideband filter 108 also provides for a balanced application of AC signals to the nodes 118A and 118D of the mixer 110. The filter 108 has a balanced construction wherein the series LC circuits 150 and 152 are constructed in opposite sides of the filter 108. In this example of the construction of the antenna 56 (FIG. 1), the radiator 22 has a balanced construction, namely, the dipole configuration with the two wings 34. The balanced configuration is retained by the aforementioned connection of the wings 34 to the respective input terminals of the filter 108. If a different form of antenna radiator were employed, such that one side of the radiator was grounded, then a balun (not shown) would be connected between the radiator and the input terminals 210 and 212 of the filter 108. In such case, the output winding of the balun transformer would be connected between the terminals 210 and 212, thereby to provide for the balanced application of the radiator signal between the mixer nodes 118A and 118D.

In similar fashion, the output signal of the mixer 110, appearing across the nodes 188C and 118B, are coupled to the balanced input terminals 158 and 160 of the filter 112. It is noted that any DC voltage produced by the photocell 104 is isolated by the capacitors 174, 176, 178, and 180 from the mixer 110. An AC signal outputted by the filter 112 is applied across the series circuit of the inductors 200 and 202, their combined inductance appearing in parallel with the inductance of the tank circuit 172. The inductance of the inductors 200 and 202, taken in conjunction with the capacitance of the capacitor 206 and the elements of the optical modulator 106 connected thereto, serve to match an impedance presented by the modulator 106 to an output impedance of the filter 112. It is noted also that the inductance 200 and the inductance 188 are serially connected with the capacitor 206 whereby a series resonance is established at the center frequency of the filter 112, thereby to ensure effective application of the AC signal across the plates 192 and 194 of the capacitor 184.

The photodetector 98 receives an RF signal via the fiber optic line 74, and applies the RF signal across the mixer 110 via the gate terminals of the transistors 114. The RF voltage is applied between the junction of the gates of the transistors 114B and 114C and the junction of the gates of the transistors 114A and 114D. Similarly, the wide band filter 108 applies its RF signal, received from the radiator 22, across the mixer 110 via the nodes 118A and 118D. The mixer 110 outputs a signal at the difference frequency, this being the IF signal which is applied across the input terminals of the narrow band filter 112. The filter 112 is tuned to the IF so as to extract the IF signal from signals another frequencies which may be produced by the mixer 110.

The value of the inductances 188 and 186 may be selected to resonate with the capacitance of the capacitor 184 to ensure maximum application of signal voltage, outputted by the filter 112, to be applied in the modulation of the optical signal on the line 70. This is accomplished without interference from the bias voltage applied across the plates 192 and 194 by the photocell 104. The bias voltage provided by the photocell 104 serves to establish an operating region of the modulator 106 which optimizes linearity of the modulation. In similar fashion, the bias voltage provided by the photocell 102 of the drive circuit 116 is set to optimize linearity in the mixing process of the mixer 110. The photodetector 100 receives a calibration signal on fiber optic line 76 at the IF, and serves to convert the IF signal from optical format to electrical format. This signal is used as a calibration signal for checking the responsivity of the filter 12, thereby to ensure that the filter 112 is properly tuned for extraction of the IF signal from the mixer 110.

A feature in the operation of the mixer 110 is the fact that there is no source-to-drain voltage applied across any one of the transistors 114. The only voltage, this being a bias voltage from the cell 102, is applied between gate and drain terminals of the transistors 114. The photocell 102 should operate a voltage n the range of 0.8–1.5 volts to provide for the suitable bias voltage for the mixer 110. An optical power level of one milliwatt was employed in the fiber optic line 74 for operation of the photodetector 98.

The balanced line configuration of the circuitry in the various portions of the receiving circuit 30 eliminates the need for a ground plane, thereby providing the flexibility for the modular assembly 40 (FIG. 4). The wide band filter 108 is designed to match a specific reactive input impedance of the source, namely the radiator 22, to the mixer 110. The narrow band filter 112 serves to terminate the mixer to provide narrow band selectivity, for example 5 megahertz, and to match the mixer 110 to the reactive impedance of the optical modulator 106. The IF is at 200 megahertz, by way of example. The signal at the radiator 22 may be, by way of example, C-band or X-band. It is noted also that the bias provided by the photocell 102 to the mixer 110 is a reverse DC bias to stabilize the transistor drain and source impedances, to set the operating point of the LO voltage swing, and to minimize noise generation.

In the packaging of the components of the receiving circuit 30 within the modules 42 of the modular assembly 40 (FIG. 4), it is convenient to mount the drive circuit 116, including the photodetector 98 and the photocell 102 in a first one of the modules 42. The wide band filter 108 may also be located on the first module 42. In the second of the modules 42, the mixer 110 and the narrow band filter 112 may be located. The calibration photodetector 100 is also located in the second of the modules 42. The optical modulator 106 with its photocell 104 is located in the third of the modules 42. An embodiment of the assembly 40 has been constructed with a diameter of approximately 0.3 inches, and a length of approximately 10.5 inches. It is noted that the emplacement of the components of the receiving circuit 30 in various ones of the modules 42 is a matter of convenience, and that, if desired, the mixer 110 may be located in the first of the modules 42 rather than in the second of the modules 42. Also the wideband filter 108 may be located in the second of the modules 42, this being a convenient location in the event that the radiator 22 is to be connected to the midpoint of the assembly 40.

Figure 13:
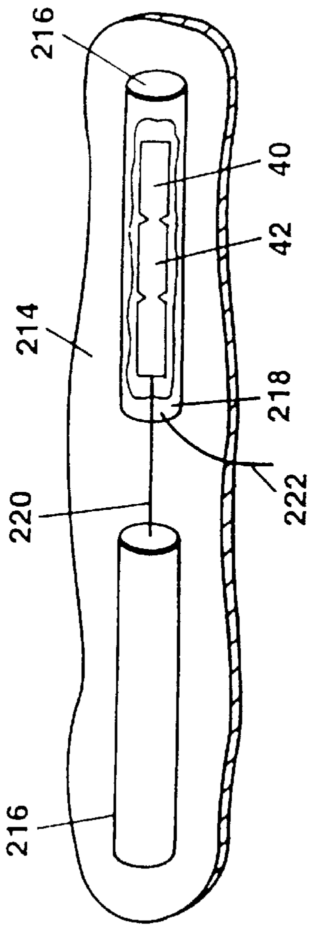
FIG. 13 shows an alternative embodiment of radiator wherein the receiving circuit is disposed within a central bore of an element of the radiator.

It is noted also that, due to the very narrow form factor of the assembly 40, it is possible to construct a dipole radiator 214, as shown in FIG. 13, wherein wings 216 of the radiator 214 have a hollow construction. This is readily accomplished by constructing each of the wings 216 as a section of cylindrical pipe having a central bore 218. The assembly 40 which is significantly smaller than the length of a component of the radiator, such as at L band, may be mounted directly within the bore 218. A wire 220 may connect one of the radiator elements to the element housing the assembly 40. Alternatively, in the event that the configuration of the radiator is such that there is one component spaced apart from the ground plane, then the wire 220 would connect to the ground plane. A cable 222 having optical fibers therein connects from the module 40 to common equipment of an antenna system, such as the common equipment 58 of FIG. 9. A tab of flexible material may be secured to one of the modules 42 of the modular assembly 40 for securing the modular assembly within the bore 218.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A flexible array antenna system, comprising:

a flexible electrically-insulating substrate, and an array of radiators supported by said substrate;

a plurality of receiving circuits coupled to respective ones of said radiators, said receiving circuits having a modular assembly comprising a plurality of modules and a flexible sheath enclosing said modular assembly for flexing with said substrate;

a set of optical fibers coupled to respective ones of said receiving circuits, said set of fibers including a first plurality of optical fibers coupled to respective ones of said receiving circuits for communicating respective ones of said received signals with a signal utilization device; and wherein said optical fibers are flexible to allow for flexing of said substrate, said optical fibers comprising electrically-insulating material for preservation of a radiation pattern of said array of radiators.

2. An antenna system according to claim 1 wherein each of said radiators is a dipole radiator.

3. An antenna system according to claim 1 wherein said utilization device comprises a receive beam former, said beam former being a part of said antenna system.

4. An antenna system according to claim 1 wherein said set of optical fibers further comprises a third plurality of optical fibers coupled to respective ones of said receiving circuits for communicating oscillator signals to respective ones of said receiving circuits from a source of oscillator signals.

5. An antenna system according to claim 4 wherein said oscillator signals are equal in frequency, and wherein said source of oscillator signals is a part of said antenna system.

6. An antenna system according to claim 1 wherein individual ones of said optical fibers of said set of optical fibers connect with individual ones of the modules of respective ones of said receiving circuits.

7. An antenna system according to claim 6 wherein each of said receiving circuits comprises a plurality of converters of optical power to electric power.

8. An antenna system according to claim 7 wherein, in each of said modular assemblies, a first of said modules connects with a radiator of said set of radiators, and wherein said first module comprises a first and a second of said converters, and a mixer, wherein said first converter is a photo cell providing a bias voltage for operation of said mixer, and said second converter is a photodetector providing a reference oscillator signal to said mixer, said mixer being operative to convert an RF signal of said radiator to an IF signal.

9. An antenna system according to claim 8 wherein said receiving circuit further comprises a filter connecting with an output terminal of said mixer for extracting the IF signal from the mixer, said filter being located in a second of said plurality of modules.

10. An antenna system according to claim 9 wherein said receiving circuit further comprises an optical modulator coupled via said filter to said mixer for outputting the signal of said radiator as an optical signal.

11. An antenna system according to claim 10 wherein, in said receiver circuit, said modular assembly comprises a third one of said modules, and said modulator is located in said third module.

12. An antenna system according to claim 11 wherein each of said modules comprising a rigid circuit board wherein a flexing of the modular assembly is provided by flexibility of said sheath enabling an articulation of said modular assembly that interfaces between individual ones of said circuit boards, electric wires and optical fibers of said receiving circuit being flexible to permit said articulation.

13. An antenna system according to claim 11 wherein said mixer includes a calibration circuit responsive to an optical calibration signal applied to said mixer via an optical fiber of said set of optical fibers, said receiving circuit further comprising an additional photodetector for converting said calibration signal from an optical form to an electrical form, and wherein said receiving circuit further comprises an additional photocell for converting optical power provided by another fiber of said set of optical fibers to electric power for operation of said modulator.

14. An antenna system according to claim 6 wherein the modules in each of said modular assemblies are arranged serially to provide an elongated form to each of said modular assemblies, and wherein said radiators are arranged in rows and columns in said array, and said elongated modular assemblies are arranged in corresponding rows and columns for electrical connection with respective ones of said radiators.

15. An antenna system according to claim 14 wherein said modular assemblies are contiguous to said substrate, wherein the arrangement of the elongated assemblies in rows permits a bending of said substrate and said modular array about an axis parallel to said rows, and wherein the flexibility of individual ones of said modular assemblies permits a bending of said array and said substrate about an axis perpendicular to said rows of modular assemblies.

16. An antenna system according to claim 1 wherein each of said modules comprising a rigid circuit board wherein a flexing of the modular assembly is provided by flexibility of said sheath enabling an articulation of said modular assembly that interfaces between individual ones of said circuit boards, electric wires and optical fibers of said receiving circuit being flexible to permit said articulation.

17. An antenna system according to claim 15 wherein said receiving circuit further comprises means for converting an RF signal of a radiator coupled to said receiving circuit to IF signal, and wherein said receiving circuit further comprises an optical modulator for outputting the IF signal as an optical signal via an optical fiber of said first plurality of optical fibers.

18. An antenna system according to claim 17 further comprising a source of reference signals coupled by a third plurality of optical fibers of said set of optical fibers to respective ones of said receiving circuits, said reference signals being applied to said converting means for use as a reference signal in conversion from RF to IF.

19. A mixer for providing a conversion between RF and IF signals, the mixer comprising:

a ring circuit comprised of four field-effect transistors wherein a drain terminal of one of said transistors is connected to a drain terminal of a second of said transistors via a junction point, there being a total of four junction points interconnecting said four transistors;

a sheath enabling an articulation of said modular assembly that interfaces between individual ones of said circuit boards, electric wires and optical fibers of said receiving circuit being flexible to permit said articulation;

an electrical inputting of one of said RF and IF signals to one pair of said junction points disposed at opposite ends of said ring circuit;

an output circuit connected to the remaining ones of said junction points; and a photodetector connected between a source of the other of said RF and IF signals, said other of said RF and IF signals being in optical form, said photodetector converting the optical form to an electrical form for applying said other of said RF and said IF signals to opposed pairs of gate terminals of said transistors.

20. A flexible circuit assembly providing electric signal processing with power provided optically, the assembly comprising:

a modular assembly comprising plural modules, and wherein individual ones of said modules carry optical fibers for conduction of optical power and signals to the circuit assembly, and wherein individual ones of said optical fibers connect with individual ones of said modules;

a plurality of converters of optical power to electric power, individual ones of said power converters being connected to individual ones of said optical fibers;

a set of input terminals for receipt of a signal to be processed, said signal being an RF signal, and said input terminals being in one of said modules, said one module comprising a first and a second of said power converters and a mixer;

wherein said first converter is a photocell providing a bias voltage for operation of said mixer, and said second converter is a photodetector providing a reference oscillator signal to said mixer, said mixer being operative to convert an RF signal of said set of input terminals to an IF signal.

21. A flexible circuit assembly according to claim 20 further comprising a filter connecting with an output terminal of said mixer for extracting the IF signal from the mixer, said filter being located in a second of said plurality of modules.

22. A flexible circuit assembly according to claim 21 wherein said receiver circuit further comprises an optical modulator coupled via said filter to said mixer for outputting the signal of said set of input terminals as an optical signal on one of said optical fibers.

23. A flexible circuit assembly according to claim 22 further comprising a third one of said modules, said modulator being located in said third module.

24. A flexible circuit assembly according to claim 23 further comprising a flexible sheath enclosing said modular assembly, each of said modules comprising a rigid circuit board wherein a flexing of the modular assembly is provided by flexibility of said sheath enabling an articulation of said modular assembly at interfaces between individual ones of said circuit boards, electric wires and optical fibers of circuitry within said circuit assembly being flexible to permit said articulation.

25. A flexible circuit assembly according to claim 23 wherein said mixer includes a calibration circuit responsive to an optical calibration signal applied to said mixer via one of said optical fibers, the assembly further comprising an additional photodetector for converting said calibration signal from an optical form to an electrical form, and wherein the modular assembly further comprises an additional photocell for converting optical power provided by another fiber of said optical fibers to electric power for operation of said modulator.

26. An antenna system comprising an antenna with a hollow radiator, the hollow radiator being electrically connected to and enclosing a flexible circuit assembly for receiving signals from the radiator, the flexible circuit assembly comprising:

a modular assembly comprising plural modules, and wherein individual ones of said modules carry optical fibers for conduction of optical power and signals to the circuit assembly, and wherein individual ones of said optical fibers connect with individual ones of the modules;

a plurality of converters of optical power to electric power, individual ones of said power converters being connected to individual ones of said optical fibers;

a set of input terminals for receipt of a signal to be processed, said signal being an RF signal, and said input terminals being in one of said modules, said one module comprising a first and a second of said power converters and a mixer;

wherein said first converter is a photocell providing a bias voltage for operation of said mixer, and said second converter is a photodetector providing a reference oscillator signal to said mixer, said mixer being operative to convert an RF signal of said set of input terminals to an IF signal.

27. A flexible array antenna system, comprising:

a flexible electrically-insulating substrate, and an array of radiators supported by said substrate;

a plurality of receiving circuits coupled to respective ones of said radiators, said receiving circuits outputting signals received by respective ones of said radiators;

a set of optical fibers coupled to respective ones of said receiving circuits, said set of fibers including a first plurality of optical fibers coupled to respective ones of said receiving circuits for communicating respective ones of said received signals with a signal utilization device, said second plurality of optical fibers supplying operating power to multiple ones of said receiving circuits; and wherein said optical fibers are flexible to allow for flexing of said substrate, said optical fibers comprising electrically-insulating material for preservation of a radiation pattern of said array of radiators;

wherein each of said receiving circuits has a flexible construction for flexing with said substrate;

wherein each of said receiving circuits has a modular assembly comprising plural modules, and wherein individual ones of said optical fibers of said set of optical fibers connect with individual ones of the modules of respective ones of said receiving circuits; and wherein said receiving circuit further comprises a flexible sheath enclosing said modular assembly, each of said modules comprising a rigid circuit board wherein a flexing of the modular assembly is provided by flexibility of said sheath enabling an articulation of said modular assembly that interfaces between individual ones of said circuit boards, electric wires and optical fibers of said receiving circuit being flexible to permit said articulation.

28. An antenna system according to claim 27 wherein said receiving circuit farther comprises means for converting an RF signal of a radiator coupled to said receiving circuit to IF signal, and wherein said receiving circuit further comprises an optical modulator for outputting the IF signal as an optical signal via an optical fiber of said first plurality of optical fibers.

29. An antenna system according to claim 28 further comprising a source of reference signals coupled by a third plurality of optical fibers of said set of optical fibers to respective ones of said receiving circuits, said reference signals being applied to said converting means for use as a reference signal in conversion from RF to IF.

* * * * *

UNITED STATES PATENT AND TRADEMARK OFFICE
CERTIFICATE OF CORRECTION

PATENT NO. : 6,362,906 B1
DATED : March 26, 2002
INVENTOR(S) : Richard L. O'Shea It is certified that error appears in the above-identified patent and that said Letters Patent is hereby corrected as shown below:

Title page,
Item [57], ABSTRACT,
Line 7, delete "beam former" and replace with -- beamformer --.

Column 1,
Line 49, delete "beam former" and replace with -- beamformer --.

Column 2,
Line 10, delete "beam former, which beam former" and replace with -- beamformer, which beamformer --.
Line 44, delete "photo cells" and replace with -- photocells --.

Column 4,
Line 63, delete "where are" and replace with -- where --.

Column 5,
Lines 19-20, delete "beam forming" and replace with -- beamforming --.
Line 65, delete "an LO" and replace with -- a LO --.

Column 6,
Line 3, delete "an LO" and replace with -- a LO --.
Line 6, delete "beam former" and replace with -- beamformer --.
Line 12, delete "in-the" and replace with -- in the --.
Line 13, delete "beam former" and replace with -- beamformer --.
Line 36, delete "contiguous the" and replace with -- contiguous to the --.

Column 11,
Line 3, delete "n the" and replace with -- in the --.

Column 12,
Line 23, delete "beam former" and replace with -- beamformer --.
Line 24, delete "beam former" and replace with -- beamformer --.

UNITED STATES PATENT AND TRADEMARK OFFICE

CERTIFICATE OF CORRECTION

PATENT NO. : 6,362,906 B1
DATED : March 26, 2002
INVENTOR(S) : Richard L. O'Shea It is certified that error appears in the above-identified patent and that said Letters Patent is hereby corrected as shown below:

Column 16,
Line 22, delete "farther" and replace with -- further --.

Signed and Sealed this

Second Day of July, 2002

*Attest:*

JAMES E. ROGAN

*Attesting Officer* *Director of the United States Patent and Trademark Office*